United States Patent [19]

Coppolani et al.

[11] Patent Number: 4,763,754
[45] Date of Patent: Aug. 16, 1988

[54] HYDRAULIC CLATTER DAMPING DEVICE AND ITS APPLICATION TO VALVES AND THE LIKE

[75] Inventors: Pierre Coppolani, Paris; Jean-Marc Henry, Courbevoie; Pierre Savary, Strasbourg; Jean Eisele, Schiltigheim, all of France

[73] Assignee: Framatome, Courbevoie, France

[21] Appl. No.: 24,440

[22] Filed: Mar. 11, 1987

[30] Foreign Application Priority Data

Mar. 11, 1986 [FR] France .................. 86 03548

[51] Int. Cl.$^4$ .............................................. F16K 47/02
[52] U.S. Cl. ..................................... 181/237; 181/233
[58] Field of Search ................. 181/233, 234, 226, 237

[56] References Cited

U.S. PATENT DOCUMENTS 2,829,669  4/1958  Luzynski ................... 181/233 X

FOREIGN PATENT DOCUMENTS 1198836 12/1959 France .
1512209  2/1968 France .

Primary Examiner—B. R. Fuller
Attorney, Agent, or Firm—Pollock, Vande Sande & Priddy

[57] ABSTRACT

Hydraulic clatter damping device consisting of a piston mechanically connected to a valve spindle and sliding within a closed composite chamber (20) consisting of two sub-chambers arranged on either side of the piston, namely, a large sub-chamber (23) in the upper part and a compression chamber (24) in the lower part, both chambers being filled with the same hydraulic fluid under pressure, the piston being provided with a hollow deformable body filled with a gaseous fluid, being rigidly connected to its free face in the large sub-chamber and contracted during rest by the pressure prevailing in the sub-chambers. The sub-chambers communicate with a thin-walled nozzle (26), the chamber containing the hollow body comprising a visual communication means which permits its upper face to be observed. The invention relates to the manufacture of safety valves and other safety components.

9 Claims, 2 Drawing Sheets

HYDRAULIC CLATTER DAMPING DEVICE AND ITS APPLICATION TO VALVES AND THE LIKE

FIELD OF THE INVENTION

This invention relates to an hydraulic clatter movement damping device for valves and similar fluid distribution components.

BACKGROUND OF THE INVENTION

A valve, just as any hydraulic device for the regular or occasional outlet or distribution of fluid, comprises a blocking element which is caused to open by means of an overpressure of the fluid or by means of an external operating device.

In a clack-valve, when the pressure does not exceed a value which is considered to be normal, the clack-valve blocks the outlet orifice, this being caused by the thrust of a loaded spring. The pressure rise causes the clack-valve to open either rapidly or gradually, which generates a rapid pressure drop upon discharge.

When the overpressure remains low, the clack-valve is inclined to close again after opening due to the pressure drop occurring when the clack-valve opens.

Provided conditions remain identical, the closing of the clack-valve is followed by an increase in pressure, thus causing the clack-valve to open again, and so forth.

As this phenomenon is not cumulative, it causes alternating movements called clatter.

Depending upon the magnitude of the pressures, the frequency of this clatter may increase and may cause repeated shocks of the clack-valve on its seat and overheating, which in turn may cause damage, such damage being the source of valve malfunction, leaks and even jamming in the open position, and possibly leading to eventual failure of the controls.

Such malfunctions may cause severe damage to the installation and to the whole environment. Damping devices are known which make it possible to avoid or at least to sufficiently reduce the clatter movement of the valves.

Such mechanical devices simply make it possible to neutralize the phenomenon of clack-valve clatter.

Another group of several damping devices are provided with stabilizers or hydraulic brakes. Examples can be found in French Patent Nos. 2.473.670 in the name of Electricite de France and 2.484.582 in the name of the Fisher Controls Company.

French Patent No. 2.473.670 relates to a safety valve comprising a hydraulic damping device between the clack-valve and the spring, the plate-type piston of the damping device being inserted between the spindle of the clock-valve and the spindle of the spring. The piston demarcates two chambers, one on either face, the said chambers being interconnected by means of one or several simple connection(s) in the form of flexible or rigid conduits.

By way of variation, a communication between the chambers is moreover provided, this communication being effected through calibrated transverse passages, each of which may be provided with a clack-valve, in order to obtain a different damping effect of the movable components of the valve during opening and closing, by calibrating these passages differently.

This damping device can unfortunately not function correctly due to its lack of thermal compensation.

Moreover, the damping device being placed invertedly between the clack-valve and the spring, causes serious complications during assembly. Moreover, there exists no visual referece by means of which leaks and the lack of oil due to such leaks may be observed.

French Patent No. 2.484.582 relates to an hydraulic auxiliary device with a stabilizer in the form of a cylinder, mounted vertically on the top of the valve. In this cylinder is a moving piston which is connected to a spindle. The upper portion of this spindle is integral with a rigid external frame which opens out vertically around the cylinder in order to ensure the connection between the piston spindle and the extension of the valve spindle. A transverse plate provided with orifices blocks the internal chamber of the cylinder at a certain height. In the upper part this plate demarcates the course of the piston and forms two chambers inside the cylinder, these two chambers being interconnected through a distribution block. The communication is effected inside the distribution block by means of a first channel provided with a variable-section restriction followed by a second channel occupied by a non-return ball-valve through which the fluid passes in the direction from the upper chamber to the lower chamber.

The oil level may be checked by means of sight slits screwed onto the cylinder cover.

By driving back the oil from one chamber to the other through small orifices, the stabilizer according to this invention makes it possible to regulate the displacement of the movable components of the valve, thus eliminating the sudden accelerations and decelerations which may generate the clatter movements.

Stabilization, however, even though it is probably quite efficient, necessitates the construction of an external frame for transmitting the movement, which complicates the construction. Moreover, as the oil does not fill the chambers completely, a closed circuit is not formed. Consequently, use in an upright position is imperative.

In these devices neither compensation for the volume of oil lost due to leaks or temperature variations, nor improved efficiency is provided.

It is known elsewhere to compensate for the oil volume by means of a capsule or bellows filled with a gaseous fluid which is susceptible to contractions or expansions.

French Patent Nos. 2.381.343 and 2.408.771 QUIRI relate to one or several gas-filled volumes which are susceptible to dimensional variations, these volumes being placed in the hydraulic circuit of a damping device in order to compensate for expansions and to absorb pressure shocks.

The main object of these inventions is twofold. On the one hand they relate to compensation for volume variation(s) due to the expansion of the oil resulting from a rise in temperature, and on the other hand they relate to the suppression of the cavitation phenomenon by compensating for losses in the oil charge due to the passage thereof through the discharge nozzles at the time of aspiration.

In order to suppress or at least greatly reduce the clatter of a valve without disturbing the functioning of the valve, the damping must be progressive and efficient.

Moreover, to ensure reliable functioning, it is desirable to be able to compensate automatically for losses and to check the oil level quickly.

Finally, the reliability required dictates the necessity for the valve to open rapidly and to close gradually.

SUMMARY OF THE INVENTION

The present invention aims to remedy the aforementioned disadvantages by proposing a hydraulic clatter damping device for valves, this device being integral with the body of the valve and very efficient and feasible.

To this end, the hydraulic valve clatter damping device according to the invention comprises a piston rigidly connected to the spindle of said valve, the piston being provided in a chamber composed of a large chamber on one side of the piston and a compression chamber on the other side of the piston, these chambers being hydraulically interconnected by means of a thin-walled nozzle shunted by a non-return valve, the piston comprising a hollow deformable body rigidly connected to its free end in the large chamber, the hollow deformable body being filled with a gaseous fluid and being contracted during rest by the pressure of the hydraulic fluid contained in the chambers.

We specify hereinafter a few of the numerous advantages procured by the invention:
high functional reliability;
total efficiency in extreme temperature conditions;
automatic compensation for small losses;
total suppression of cavitation;
simplicity of assembly and replacement;
simple and quick maneuvering device;
the damping device may be installed without impeding the installation of an auxiliary device;
manually operated external device.

The characteristics and other advantages are mentioned in the description which follows, given as a non-limiting example of a preferred embodiment, with reference to the attached drawings in which.

DETAILED DESCRIPTION

The invention will now be described with reference to a valve as an example of the application of the invention.

Figure 1:
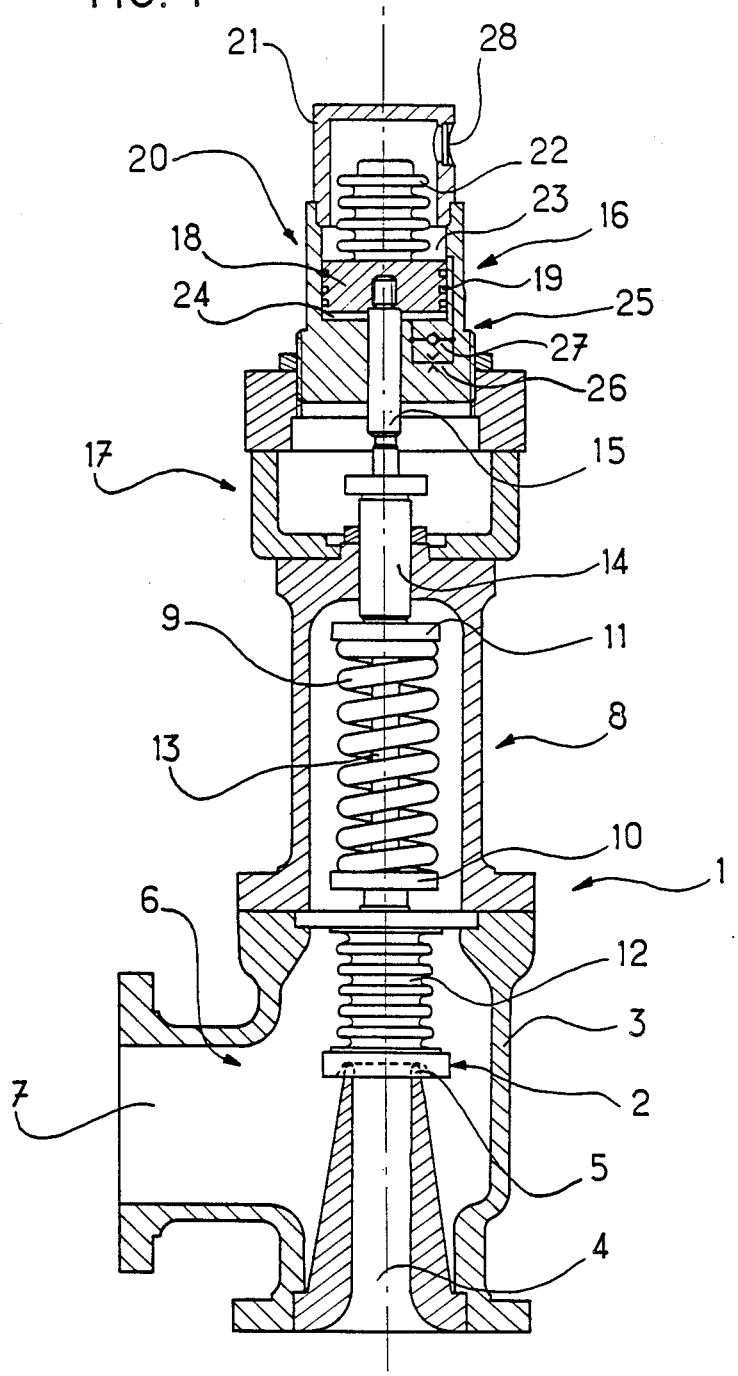
FIG. 1 shows a cross-section of the damping device mounted on a valve.

As shown in FIG. 1 valve 1 conventionally presents a clack-valve 2 mounted in a body 3, this body being provided with an inlet conduit 4 which opens through a seat 5 on the level of the clack-valve into a discharge chamber 6, this discharge chamber being evacuated through a lateral outlet 7.

The body 3 is extended by a valve head 8 comprising a loaded return spring 9 between two rings, one at the lower end 10 and one at the upper end 11. The lower ring is integrally connected to the clack-valve 2 by means of an axle 12 and the movement is transmitted to the upper part by a spindle 13 which extends through the loaded spring 9 and the upper ring 11. The spindle 13 likewise extends through the upper casing by means of a guide sleeve 14 beyond which it continues as a shunting spindle 15 of a reloadable hydraulic damping device 16 fitted on a mechanized block 17 above the valve head 8.

The hydraulic damping device shown in general in the drawings comprises a piston 18 with rings 19, this piston being integral with the shunting spindle 15 which is mechanically connected to the clack-valve 2, the said piston moving along a chamber 20 of which the upper portion is enclosed by means of a housing 21. This piston also comprises a hollow deformable body connected to it on the side opposite to the shunting spindle, this body for example being in the form of a bellows 22 filled with a gaseous fluid.

The chamber 20 consists of two sub-chambers, one on either side of the piston; a large chamber 23 which is partially filled by the bellows 22 and a compression chamber 24. According to the invention, the large chamber 23 and the compression chamber 24 are filled with a pressurized hydraulic fluid, these two chambers being interconnected by means of an hydraulic connection 25 comprising a thin-walled nozzle 26 and a non-return valve 27. This connection is either inside the piston of the mechanized block, or altogether outside.

The purpose of this non-return valve is to suppress, in one direction or in the other, the damping effect brought about by the thin-walled nozzle. The position of the non-return valve, which allows fluid to pass in the direction of upward movement of the piston, ensures that the opening movement of the valve 1 is not restrained.

The pressurized fluid in the chamber keeps the bellows 22 slightly contracted, thus making it possible to dispose of a variable volume to compensate for expansion of the volume of oil or for evenutual losses through leaks.

The upper part of the housing 21 is provided with a transverse visual communication means in the form of a port 28 of which the field of vision makes it possible to detect the level of the upper wall of the bellows 22 and thus to obtain information on the quantity of hydraulic fluid.

An external operating device 29 with a manual mechanism 30 (FIG. 2) or an hydraulic mechanism 31 (FIG. 3) makes it possible to maneuver by means of a direct or remote controlled external action, the movement of the valve spindle or the piston. This maneuver is more particularly used for reloading, for disengagement during maintenance and for releasing in the case of jamming.

Figure 2:
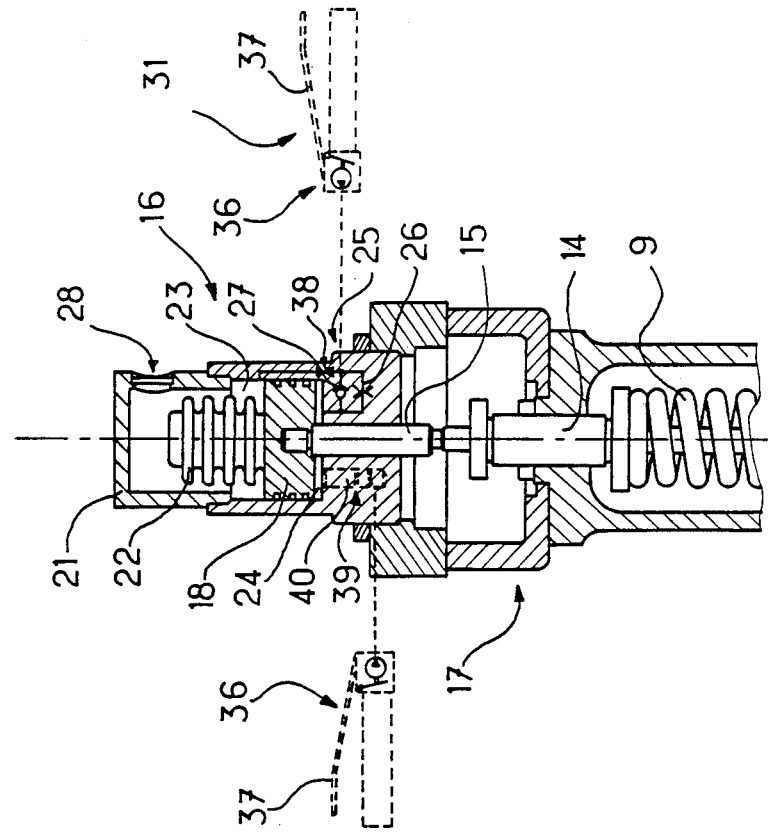
FIG. 2 shows a longitudinal cross-section of the damping device alone provided with a manual reloading mechanism.
Figure 3:
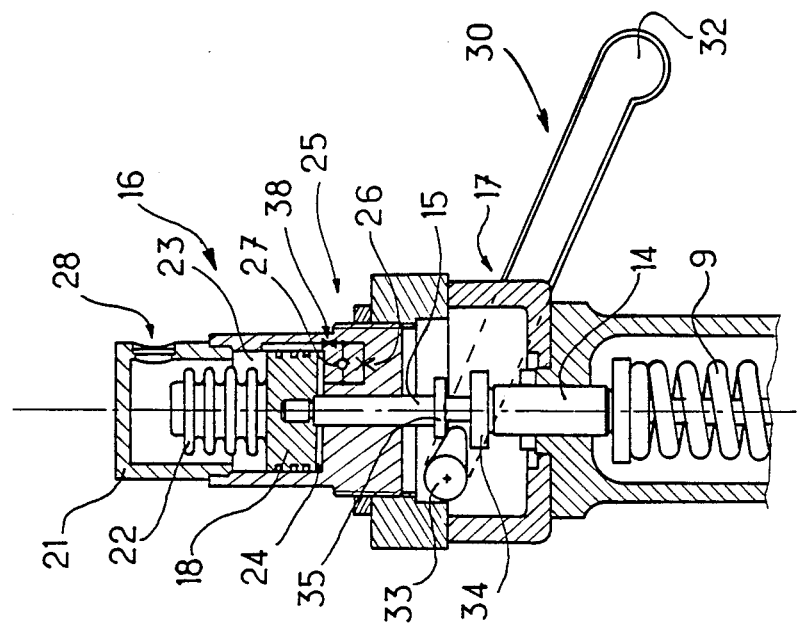
FIG. 3 shows a lengthwise cross-section of the damping device alone provided with a hydraulic controlling device.

The two embodiments of these operating devices are shown in FIGS. 2 and 3 which represent the damping device equipped as hereinbefore described.

More precisely, the manual mechanism 30 comprises a control lever 32 pivotally mounted on the valve head. The pivot axis operates a nut 33 or other cam profile permitting the downwards maneuvering of the valve spindle by pushing downwards on a washer or a disc 34, or, inversely, the upward maneuvering through contact and pushing of the cam 33 with an upper washer 35 provided at a small distance from the disc 34. The interval between these two components is close to the thickness of the cam end in order to limit backlash.

The external operating device has hydraulic controls 31 and comprises a hydraulic hand pump 36 which is operated by a lever 37.

The two variations which are simultaneously shown in FIG. 3 permit the piston to be hydraulically or hydromechanically lifted either directly, by applying pressure to the piston, or indireclty by means of an external mechanical element.

According to a first embodiment, the hand pump 36 is hydraulically connected to the hydraulic connection 25. This connection may be upstream or downstream of the nozzle 26 and non-return valve 27 group, but preferably downstream as shown in FIG. 3.

To prevent the drive fluid from entering the large chamber 23 which is partially filled by the bellows 22, a stop-clock is provided on the portion of the hydraulic connection 25 between the point where the hand pump enters and the aforementioned large chamber 23. According to this embodiment, the hydraulic fluid which is injected under pressure by means of the hand pump 36 acts on the cross-head of the piston, thereby causing the piston to rise, and the valve thus opens by means of an external command.

According to a second embodiment, the hand pump 36 is connected to an auxiliary lifting piston 30 which moves along a chamber 40 provided in the base block of the damping device according to the invention. This auxiliary lifting piston restrains the upward movement of the piston 18 by exerting a vertical pressure, thus effecting a maneuver through an external manual command.

The adjunction of an external command by auxiliary pump makes it possible to command the valve by remote control.

These external devices enable the reloading function of the damping device as well as disengagement during maintenance and release in case of jamming.

They may also be used as remote control means to meet regulating requirements and to verify that the valve is functioning properly.

The general functioning of the clatter damping device will hereinafter by explained.

The damping device being loaded with oil under pressure, the clack-valve of the valve is pushed up by an occasional overpressure and is inclined to clatter. The piston is simultaneously caused to effect longitudinal displacements along the length of the chamber.

The first movement is the upward movement for which the damping will be slight if the clack-valve is chosen to pass in the upward direction. The opening takes place with reduced damping in order to realize the conditions of positive safety.

The efficiency of the damping results from the association of a movable piston in an hydraulic fluid under pressure with the hydraulic communication circuit comprising the restricted nozzle.

The oil siphons more or less easily from one chamber to the other at each movement of the pistons due to the existence of the non-return valve. The laminary flow during the passage through the restricted nozzle causes an additional damping effect, whereas the direct passages into the non-return valve introduces practically no additional damping effect at all.

The invention as described hereinabove extended to the different variations of the damping device and covers all possible applications for mechanical damping.

We claim:

1. Hydraulic clatter damping device comprising a piston (18) mechanically connected to a valve spindle and slidable within a closed chamber (20) consisting of two sub-chambers, one on either side of the piston, said sub-chambers including a large sub-chamber (23) in an upper part and a compression chamber (24) in a lower part, both sub-chambers being filled with the same hydraulic fluid under pressure, the piston being provided with a hollow deformable body rigidly connected to a free face thereof in the large sub-chamber, the hollow deformable body being filled with a gaseous fluid and being contracted during rest by pressure prevailing in the sub-chambers, said sub-chambers communicating by means of an hydraulic damping connection (25) with a thin-walled nozzle (26), said compression chamber (24) comprising a visual communication means which permits an upper face of the hollow body to be observed.

2. Hydraulic damping device according to claim 1, wherein the hollow deformable body is a bellows (22).

3. Hydraulic damping device according to claim 2, wherein the bellows (22) is made of metal.

4. Hydraulic damping device according to claim 1, wherein the thin-walled nozzle (26) is shunted by a non-return valve (27).

5. Hydraulic damping device according to claim 1, including a manual operating device (30) with a lever (32) is provided on the valve spindle.

6. Hydraulic damping device according to claim 1, wherein an hydraulic operating device (31) with a hand pump (36) maneuvers the piston.

7. Hydraulic damping device according to claim 6, wherein the hand pump (36) is connected to the hydraulic connection (25).

8. Hydraulic damping device according to claim 6, wherein the hydraulic operating device (31) with the hand pump (36) is connected to an auxiliary piston (39) which acts directly on the piston (18) of the damping device.

9. Hydraulic damping device according to claim 6, wherein the hydraulic operating device (31) is used as a remote control.

* * * * *